US008736939B2

(12) United States Patent
Hong et al.

(10) Patent No.: US 8,736,939 B2
(45) Date of Patent: May 27, 2014

(54) MATCHING LAYER THIN-FILMS FOR AN ELECTROMECHANICAL SYSTEMS REFLECTIVE DISPLAY DEVICE

(75) Inventors: John Hyunchul Hong, San Clemente, CA (US); Jian J. Ma, Carlsbad, CA (US); Tallis Young Chang, San Diego, CA (US); Chong Uk Lee, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 34 days.

(21) Appl. No.: 13/289,937

(22) Filed: Nov. 4, 2011

(65) Prior Publication Data

US 2013/0114121 A1     May 9, 2013

(51) Int. Cl.
*G02F 1/15* (2006.01)
*G02B 26/00* (2006.01)

(52) U.S. Cl.
USPC .......................................... 359/260; 359/291

(58) Field of Classification Search
CPC .. G02B 26/001; G02B 26/02; G02B 26/0833; G02B 26/0841; G09G 3/22; G09G 3/3466
USPC .............. 345/84, 85; 359/260, 290, 291, 292, 359/295, 578
See application file for complete search history.

(56) References Cited

U.S. PATENT DOCUMENTS

| | | | |
|---|---|---|---|
| 2,590,906 A | 4/1952 | Tripp | |
| 2,677,714 A | 5/1954 | Auwarter | |
| 3,247,392 A | 4/1966 | Thelen | |
| 3,679,313 A | 7/1972 | Robert | |
| 3,728,030 A | 4/1973 | Hawes | |
| 3,886,310 A | 5/1975 | Guldberg | |
| 3,955,190 A | 5/1976 | Teraishi | |
| 4,403,248 A | 9/1983 | Te Velde | |
| 4,421,381 A | 12/1983 | Ueda et al. | |
| 4,441,789 A | 4/1984 | Pohlack | |
| 4,441,791 A | 4/1984 | Hornbeck | |

(Continued)

FOREIGN PATENT DOCUMENTS

| | | |
|---|---|---|
| DE | 102006039071 A1 | 2/2008 |
| EP | 0035299 A2 | 9/1981 |

(Continued)

OTHER PUBLICATIONS

International Search Report and Written Opinion—PCT/US2012/061661—ISA/EPO—Jan. 17, 2013.

(Continued)

*Primary Examiner* — David N Spector
(74) *Attorney, Agent, or Firm* — Weaver Austin Villeneuve & Sampson, LLP

(57) ABSTRACT

This disclosure provides systems, methods and apparatus for an electromechanical systems reflective display device. In one aspect, an electromechanical systems display device includes a reflective layer and an absorber layer. The absorber layer is spaced apart from the reflective layer to define a cavity between the absorber layer and the reflective layer. The absorber layer is capable of transmitting light into the cavity, absorbing light, and reflecting light, and includes a metal layer. A plurality of matching layers are on a surface of the absorber layer facing away from the cavity, the plurality of matching layers including a first matching layer disposed on the absorber layer and a second matching layer disposed on the first matching layer.

25 Claims, 13 Drawing Sheets

(56) References Cited

U.S. PATENT DOCUMENTS

| | | |
|---|---|---|
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zayhowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,337,191 A | 8/1994 | Austin |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goossen |
| 5,719,068 A | 2/1998 | Suzawa et al. |
| 5,734,177 A | 3/1998 | Sakamoto |
| 5,771,116 A | 6/1998 | Miller et al. |
| 5,786,927 A | 7/1998 | Greywall |
| 5,808,781 A | 9/1998 | Arney et al. |
| 5,818,095 A | 10/1998 | Sampsell |
| 5,825,528 A | 10/1998 | Goossen |
| 5,838,484 A | 11/1998 | Goossen |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,124,851 A | 9/2000 | Jacobson |
| 6,242,932 B1 | 6/2001 | Hembree |
| 6,262,697 B1 | 7/2001 | Stephenson |
| 6,301,000 B1 | 10/2001 | Johnson |
| 6,323,987 B1 | 11/2001 | Rinaudo et al. |
| 6,327,071 B1 | 12/2001 | Kimura |
| 6,335,235 B1 | 1/2002 | Bhakta et al. |
| 6,351,329 B1 | 2/2002 | Greywall |
| 6,356,378 B1 | 3/2002 | Huibers |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles |
| 6,680,792 B2 | 1/2004 | Miles |
| 6,698,295 B1 | 3/2004 | Sherrer |
| 6,710,908 B2 | 3/2004 | Miles et al. |
| 6,738,194 B1 | 5/2004 | Ramirez et al. |
| 6,768,555 B2 | 7/2004 | Chen et al. |
| 6,794,119 B2 | 9/2004 | Miles |
| 6,813,059 B2 | 11/2004 | Hunter et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,888,661 B1 | 5/2005 | Islam et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 6,983,820 B2 | 1/2006 | Boast et al. |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,873 B2 | 4/2007 | Geh et al. |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,269,325 B2 | 9/2007 | Hou |
| 7,289,259 B2 | 10/2007 | Chui et al. |
| 7,302,157 B2 | 11/2007 | Chui |
| 7,304,784 B2 | 12/2007 | Chui et al. |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,405,852 B2 | 7/2008 | Hagood et al. |
| 7,417,746 B2 | 8/2008 | Lin et al. |
| 7,420,725 B2 | 9/2008 | Kothari |
| 7,436,573 B2 | 10/2008 | Doan et al. |
| 7,459,402 B2 | 12/2008 | Doan et al. |
| 7,460,291 B2 | 12/2008 | Sampsell et al. |
| 7,460,292 B2 | 12/2008 | Chou |
| 7,476,327 B2 | 1/2009 | Tung et al. |
| 7,477,440 B1 | 1/2009 | Huang |
| 7,492,503 B2 | 2/2009 | Chui |
| 7,508,566 B2 | 3/2009 | Feenstra et al. |

(56) References Cited

U.S. PATENT DOCUMENTS

| | | |
|---|---|---|
| 7,513,327 B1 | 4/2009 | Peterson |
| 7,515,327 B2 | 4/2009 | Cummings |
| 7,527,995 B2 | 5/2009 | Sampsell |
| 7,532,377 B2 | 5/2009 | Miles |
| 7,535,621 B2 | 5/2009 | Chiang |
| 7,542,189 B2 | 6/2009 | Tanimura et al. |
| 7,542,198 B2 | 6/2009 | Kothari |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,566,664 B2 | 7/2009 | Yan et al. |
| 7,567,373 B2 | 7/2009 | Chui et al. |
| 7,569,488 B2 | 8/2009 | Rafanan |
| 7,612,932 B2 | 11/2009 | Chui et al. |
| 7,612,933 B2 | 11/2009 | Djordjev |
| 7,629,197 B2 | 12/2009 | Luo et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,715,079 B2 | 5/2010 | Kogut et al. |
| 7,715,085 B2 | 5/2010 | Sasagawa |
| 7,719,500 B2 | 5/2010 | Chui |
| 7,738,157 B2 | 6/2010 | Miles |
| 7,742,220 B2 | 6/2010 | Kogut et al. |
| 7,746,539 B2 | 6/2010 | Sampsell |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,808,694 B2 | 10/2010 | Miles |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell et al. |
| 7,852,545 B2 | 12/2010 | Miles |
| 7,855,826 B2 | 12/2010 | De Groot et al. |
| 7,859,740 B2 | 12/2010 | Tung |
| 7,872,792 B2 | 1/2011 | Miles |
| 7,884,989 B2 | 2/2011 | Gally et al. |
| 7,889,415 B2 | 2/2011 | Kothari |
| 7,889,417 B2 | 2/2011 | Sasagawa |
| 7,893,919 B2 | 2/2011 | Kothari et al. |
| 7,898,722 B2 | 3/2011 | Miles |
| 7,898,723 B2 | 3/2011 | Khazeni et al. |
| 7,924,494 B2 | 4/2011 | Tung et al. |
| 7,936,497 B2 | 5/2011 | Chui et al. |
| 7,944,599 B2 | 5/2011 | Chui et al. |
| 7,944,604 B2 | 5/2011 | Ganti et al. |
| 7,948,671 B2 | 5/2011 | Tung et al. |
| 7,952,787 B2 | 5/2011 | Tung et al. |
| 7,969,638 B2 | 6/2011 | Xu et al. |
| 7,982,700 B2 | 7/2011 | Chui et al. |
| 7,999,993 B2 | 8/2011 | Chui et al. |
| 8,008,736 B2 | 8/2011 | Kothari |
| 8,023,167 B2 | 9/2011 | Sampsell |
| 8,035,883 B2 | 10/2011 | Kothari |
| 8,035,884 B2 | 10/2011 | Miles |
| 8,054,527 B2 | 11/2011 | Khazeni et al. |
| 8,059,326 B2 | 11/2011 | Miles |
| 8,068,269 B2 | 11/2011 | Djordjev |
| 8,072,402 B2 | 12/2011 | Xu |
| 8,081,369 B2 | 12/2011 | Miles |
| 8,081,370 B2 | 12/2011 | Sampsell |
| 2001/0003487 A1 | 6/2001 | Miles |
| 2001/0028503 A1 | 10/2001 | Flanders et al. |
| 2001/0043171 A1 | 11/2001 | Van et al. |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kudrle et al. |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0038643 A1 | 2/2006 | Xu et al. |
| 2006/0066641 A1 | 3/2006 | Gally et al. |
| 2006/0066926 A1 | 3/2006 | Kwak et al. |
| 2006/0066936 A1 | 3/2006 | Chui et al. |
| 2006/0066938 A1 | 3/2006 | Chui |
| 2006/0067633 A1 | 3/2006 | Gally et al. |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0220160 A1 | 10/2006 | Miles |
| 2007/0020948 A1 | 1/2007 | Piehl et al. |

(56) References Cited

U.S. PATENT DOCUMENTS

| | | |
|---|---|---|
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0115415 A1 | 5/2007 | Piehl et al. |
| 2007/0138608 A1 | 6/2007 | Ikehashi |
| 2007/0153860 A1 | 7/2007 | Chang-Hasnain et al. |
| 2007/0216987 A1 | 9/2007 | Hagood et al. |
| 2007/0285761 A1 | 12/2007 | Zhong et al. |
| 2008/0002299 A1 | 1/2008 | Thurn |
| 2008/0030657 A1 | 2/2008 | Wu et al. |
| 2008/0068697 A1 | 3/2008 | Haluzak et al. |
| 2008/0110855 A1 | 5/2008 | Cummings |
| 2008/0186581 A1 | 8/2008 | Bita et al. |
| 2008/0285165 A1 | 11/2008 | Wu et al. |
| 2008/0297880 A1 | 12/2008 | Steckl et al. |
| 2009/0021884 A1 | 1/2009 | Nakamura |
| 2009/0059346 A1 | 3/2009 | Xu |
| 2009/0078316 A1 | 3/2009 | Khazeni et al. |
| 2009/0101192 A1 | 4/2009 | Kothari et al. |
| 2009/0122384 A1 | 5/2009 | Felnhofer et al. |
| 2009/0159123 A1 | 6/2009 | Kothari et al. |
| 2009/0211885 A1 | 8/2009 | Steeneken et al. |
| 2009/0213451 A1 | 8/2009 | Tung et al. |
| 2009/0231666 A1 | 9/2009 | Gudlavalleti et al. |
| 2009/0256218 A1 | 10/2009 | Mignard et al. |
| 2009/0279162 A1 | 11/2009 | Chui |
| 2009/0293955 A1 | 12/2009 | Kothari et al. |
| 2010/0051089 A1 | 3/2010 | Khazeni et al. |
| 2010/0053148 A1 | 3/2010 | Khazeni et al. |
| 2010/0096006 A1 | 4/2010 | Griffiths et al. |
| 2010/0096011 A1 | 4/2010 | Griffiths et al. |
| 2010/0118382 A1 | 5/2010 | Kothari et al. |
| 2010/0126777 A1 | 5/2010 | Hallundbaek |
| 2010/0236624 A1 | 9/2010 | Khazeni et al. |
| 2010/0238572 A1 | 9/2010 | Tao et al. |
| 2010/0309572 A1 | 12/2010 | Mignard |
| 2011/0019380 A1 | 1/2011 | Miles |
| 2011/0026095 A1 | 2/2011 | Kothari et al. |
| 2011/0026096 A1 | 2/2011 | Miles |
| 2011/0044496 A1 | 2/2011 | Chui et al. |
| 2011/0063712 A1 | 3/2011 | Kothari et al. |
| 2011/0069371 A1 | 3/2011 | Kothari et al. |
| 2011/0075241 A1 | 3/2011 | Mienko et al. |
| 2011/0075245 A1 | 3/2011 | Hashimura et al. |
| 2011/0080632 A1 | 4/2011 | Miles |
| 2011/0090554 A1 | 4/2011 | Tung |
| 2011/0116156 A1 | 5/2011 | Kothari |
| 2011/0134505 A1 | 6/2011 | Sasagawa |
| 2011/0169724 A1 | 7/2011 | Tao et al. |
| 2011/0170166 A1 | 7/2011 | Miles |
| 2011/0170167 A1 | 7/2011 | Miles |
| 2011/0170168 A1 | 7/2011 | Endisch et al. |
| 2011/0188109 A1 | 8/2011 | Chui et al. |
| 2011/0188110 A1 | 8/2011 | Miles |
| 2011/0286072 A1* | 11/2011 | Liu et al. ............... 359/290 |
| 2012/0085731 A1* | 4/2012 | Miles ............... 216/13 |

FOREIGN PATENT DOCUMENTS

| | | |
|---|---|---|
| EP | 0668490 A2 | 8/1995 |
| EP | 0695959 A1 | 2/1996 |
| EP | 0879991 A2 | 11/1998 |
| EP | 0969306 A1 | 1/2000 |
| EP | 0986077 A2 | 3/2000 |
| EP | 1122577 A2 | 8/2001 |
| EP | 1205782 A2 | 5/2002 |
| EP | 1227346 A2 | 7/2002 |
| EP | 1275997 A2 | 1/2003 |
| EP | 1403212 A2 | 3/2004 |
| EP | 1473581 A2 | 11/2004 |
| EP | 1928028 A1 | 6/2008 |
| EP | 2030947 A2 | 3/2009 |
| EP | 2224275 A1 | 9/2010 |
| JP | 56088111 | 7/1981 |
| JP | 05049238 | 2/1993 |
| JP | 05281479 | 10/1993 |
| JP | 8051230 A | 2/1996 |
| JP | 11211999 A | 8/1999 |
| JP | 2000147262 A | 5/2000 |
| JP | 2001221913 A | 8/2001 |
| JP | 2001249283 A | 9/2001 |
| JP | 2002062490 A | 2/2002 |
| JP | 2002221678 A | 8/2002 |
| JP | 2003177336 A | 6/2003 |
| JP | 2003340795 A | 12/2003 |
| JP | 2004012642 A | 1/2004 |
| JP | 2004205973 A | 7/2004 |
| JP | 2004212638 A | 7/2004 |
| JP | 2004212680 A | 7/2004 |
| JP | 2005279831 A | 10/2005 |
| JP | 2005308871 A | 11/2005 |
| JP | 2007027150 A | 2/2007 |
| WO | 9814804 A1 | 4/1998 |
| WO | 9843129 A1 | 10/1998 |
| WO | 0153113 A1 | 7/2001 |
| WO | 0224570 A1 | 3/2002 |
| WO | 02086582 A1 | 10/2002 |
| WO | 03105198 A1 | 12/2003 |
| WO | 2006035698 A1 | 4/2006 |
| WO | 2007036422 | 4/2007 |
| WO | 2007045875 A1 | 4/2007 |
| WO | 2007053438 A1 | 5/2007 |
| WO | 2007072998 A1 | 6/2007 |
| WO | 2008062363 A2 | 5/2008 |
| WO | 2009120610 A1 | 10/2009 |

OTHER PUBLICATIONS

Billard C, "Tunable Capacitor," 5th Annual Review of LETI, 2003, 7 Pages.

Brosnihan, et al., "Optical MEMS—A Fabrication Process for MEMS Optical Switches With Integrated On-Chip Electronics," 12th International Conference on TRANSDUCERS, Solid-State Sensors, Actuators and Microsystems, 2003, vol. 2, pp. 1638-1642.

Cacharelis, et al., "A Reflective-Mode PDLC Light Valve Display Technology," Proceedings of European Solid State Device Research Conference (ESSDERC), 1997, pp. 596-599.

Conner, "Hybrid Color Display using Optical Interference Filter Array," SID Digest, 1993, 577-580.

Dokmeci, et al., "Two-Axis Single-Crytal Silicon Micromirror Arrays," Journal of Microelectromechanical Systems, Dec. 2004, 13(6), 1006-1017.

Feenstra, et al., "Electrowetting displays," Liquavista BV, Jan. 2006, 16 pp.

Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.

Jerman et al., "A Miniature Fabry-Perot Interferometer with a Corrugated Silicon Diaphragm Support", IEEE Electron Devices Society, pp. 140-144, 1990.

Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.

Kowarz, et al., "Conformal Grating Electromechanical System (Gems) for High-Speed Digital Light Modulation," Proceedings of the IEEE 15th Annual International Conference on Micro Electro Mechanical Systems, MEMS 2002, pp. 568-573.

Lezec, "Submicrometer Dimple Array Based Interference Color Field Displays and Sensors," Nano Letters, 2006, 7 (2), 329-333.

Londergan, et al., "Advanced processes for MEMS-based displays," Proceedings of the Asia Display, 2007, SID, 1, 107-112.

Longhurst R.S., "Geometrical and Physical Optics", Chapter IX: Multiple Beam Interferometry, pp. 153-157, 1963.

Maier et al., 1996 1 .3" ActiveMatrix liquid crystal spatial light modulator with 508 dpi resolution, SPIE vol. 2754, pp. 171-179.

(56) References Cited

OTHER PUBLICATIONS

Mehregany, et al., "MEMS Applications in Optical Systems," IEEE/LEOS 1996 Summer Topical Meetings, 1996, 75-76.

Miles M.W., "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.

Miles M.W., "A New Reflective FPD Technology using Interferometric Modulation," Journal of the SID, 1997, vol. 5 (4), 379-382.

Miles M.W., et al., "Interferometric Modulation MEMS as an enabling technology for high-performance reflective displays," Proceedings of the SPIE, 2003, 4985, 131-139.

Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.

Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.

Pape, et al., "Characteristics of the Deformable Mirror Device for Optical Information Processing," Optical Engineering, Nov.-Dec. 1983, 22(6), 676-681.

Qualcomm MEMS Technologies, Inc., May 2008, Interferometric Modulator (IMOD), Technology Overview, White Paper, 14 pp.

Tai C.Y. et al., "A Transparent Sheet Display by Plastic MEMS," Journal of the SID, 2006, vol. 14 (8), 735-741.

Tolansky, "Multiple-Beam Interference in Multiple-Beam Interferometry of Surfaces and Films," Chap II Oxford at the Clarendon Press, 1948, pp. 8-11.

Wang, et al., "Design and Fabrication of a Novel TWO-Dimension MEMS-Based Tunable Capacitor," IEEE International Conference on Communications, Circuits and Systems and West Sino Expositions, 2002, vol. 2, 1766-1769.

\* cited by examiner

Common Voltages

| | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| Segment Voltages | $VS_H$ | Stable | Stable | Relax | Stable | Actuate |
| | $VS_L$ | Actuate | Stable | Relax | Stable | Stable |

MATCHING LAYER THIN-FILMS FOR AN ELECTROMECHANICAL SYSTEMS REFLECTIVE DISPLAY DEVICE

TECHNICAL FIELD

This disclosure relates generally to electromechanical systems (EMS) reflective display devices and more particularly to material layers on an absorber layer of an EMS reflective display device.

DESCRIPTION OF THE RELATED TECHNOLOGY

Electromechanical systems (EMS) include devices having electrical and mechanical elements, actuators, transducers, sensors, optical components (including mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Additional layers of material on a layer (such as the stationary layer and/or the reflective membrane) of an IMOD device or other EMS reflective display device may change the optical properties of the layer. For example, the reflective and/or absorptive characteristics of a layer may be modified with the additional layers of material.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including a reflective layer, an absorber layer, and a plurality of matching layers. The absorber layer may be spaced apart from the reflective layer to define a cavity between the absorber layer and the reflective layer. The absorber layer may be capable of transmitting light into the cavity, absorbing light, and reflecting light. The absorber layer may include a metal layer. The plurality of matching layers may be on a surface of the absorber layer facing away from the cavity. The plurality of matching layers may include a first matching layer disposed on the absorber layer and a second matching layer disposed on the first matching layer.

In some implementations, the first matching layer may have a first thickness and the second matching layer may have a second thickness. The first and the second thicknesses may be configured to modify at least one of an amplitude and a phase of reflected light and transmitted light to alter a red-green-blue color saturation of the apparatus.

In some implementations, the first matching layer may include a first material having a first refractive index and the second matching layer may include a second material having a second refractive index. The second refractive index may be greater than the first refractive index.

Another innovative aspect of the subject matter described in this disclosure can be implemented in an apparatus including a reflective layer, an absorber layer, a first matching layer, and a second matching layer. The absorber layer may be spaced apart from the reflective layer to define a cavity between the absorber layer and the reflective layer. The absorber layer may be capable of transmitting light into the cavity, absorbing light, and reflecting light. The absorber layer may include a metal layer. The first matching layer may have a first refractive index and be disposed on the absorber layer. The second matching layer may have a second refractive index and be disposed on the first matching layer. The second refractive index may be greater than the first refractive index.

In some implementations, the first matching layer may have a first thickness and the second matching layer may have a second thickness. The first and the second thicknesses may be configured to modify at least one of an amplitude and a phase of reflected light and transmitted light to alter a red-green-blue color saturation of the apparatus.

In some implementations, the metal layer may include at least one of vanadium, chromium, tungsten, nickel, or an alloy of molybdenum-chromium. In some implementations, the reflective layer may be configured to be movable to vary a thickness of the cavity.

Another innovative aspect of the subject matter described in this disclosure can be implemented an apparatus including a reflective layer, an absorber layer, and a plurality of matching layers. The absorber layer may be spaced apart from the reflective layer to define a cavity between the absorber layer and the reflective layer. The absorber layer may be capable of transmitting light into the cavity, absorbing light, and reflecting light. The absorber layer may include a metal layer. The reflective layer may be configured to be movable to vary a thickness of the cavity. The plurality of matching layers may be on a surface of the absorber layer facing away from the cavity. The plurality of matching layers may include a first matching layer disposed on the absorber layer and a second matching layer disposed on the first matching layer.

In some implementations, the first matching layer may have a first thickness and the second matching layer may have a second thickness. The first and the second thicknesses may be configured to modify at least one of an amplitude and a phase of reflected light and transmitted light to alter a red-green-blue color saturation of the apparatus.

In some implementations, the metal layer may include at least one of vanadium, chromium, tungsten, nickel, or an alloy of molybdenum-chromium. In some implementations, the first matching layer may include at least one of silicon dioxide, magnesium fluoride, aluminum oxide, or a plastic. In some implementations, the second matching layer may include at least one of silicon nitride, silicon oxynitride, titanium dioxide, zirconium dioxide, tantalum oxide, or antimony oxide.

Details of one or more implementations of the subject matter described in this specification are set forth in the accompanying drawings and the description below. Although the examples provided in this disclosure are primarily described in terms of electromechanical systems (EMS) and microelectromechanical systems (MEMS)-based displays, the concepts provided herein may apply to other types of displays, such as liquid crystal displays, organic light-emitting diode ("OLED") displays and field emission displays. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
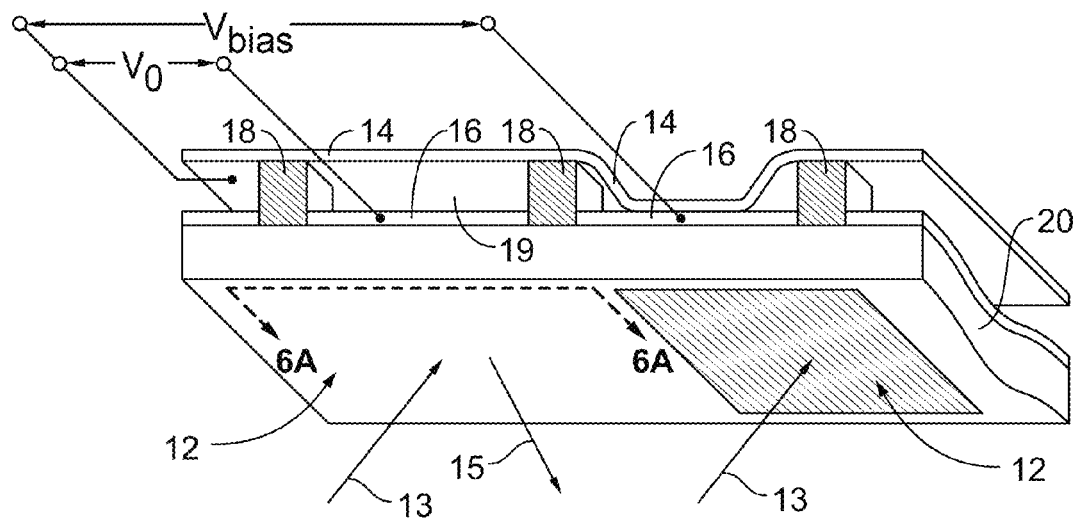
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An absorber layer of an EMS reflective display device by itself may not have the appropriate electromagnetic properties to realize the ideal spectrally selective absorption properties of the EMS reflective display device. The electromagnetic impedance of the absorber layer may vary with the wavelength of light due to the dispersion characteristics of the absorber layer (e.g, the extinction coefficient and the refractive index may vary with the wavelength of light). In particular, the reactive part of the electromagnetic impedance of the absorber layer may impart a variation in the reflection and transmission from/through the absorber layer which translates to a deterioration in the spectral filtering characteristics of the reflectance from the EMS reflective display device.

Some implementations described herein relate to material layers on an absorber layer of an EMS reflective display device. In some implementations, two or more material layers, also referred to as matching layers, may be formed on an absorber layer of an EMS reflective display device. In some implementations, a first matching layer disposed on the absorber layer may be a low refractive index material. A second matching layer disposed on the first matching layer may be a high refractive index material.

For example, in some implementations described herein, an EMS device includes a reflective layer and an absorber layer. The absorber layer may be spaced apart from the reflective layer to define a cavity between the absorber layer and the reflective layer. The absorber layer may absorb light completely, partially, or not at all, depending on the wavelength of the light and the spacing between the reflective layer and the absorber layer. The absorber layer also may include a metal layer which may provide the absorbing characteristics of the absorber layer. A plurality of matching layers may be on a surface of the absorber layer facing away from the cavity. The plurality of matching layers may include a first matching layer disposed on the absorber layer and a second matching layer disposed on the first matching layer.

Particular implementations of the subject matter described in this disclosure can be implemented to realize one or more of the following potential advantages. Two or more matching layers on a surface of the absorber layer of an EMS reflective display device may improve the color saturation for a specific primary color or for the complete primary color set (i.e., the red-green-blue (RGB) color set) of the EMS reflective display device. Two or more matching layers also may allow for the improvement of a white-state of an EMS reflective display device.

Another advantage of including matching layers above and below the absorber layer may be to provide an extra degree of design freedom in tailoring the impedance properties of the absorber layer. The matching layers also may allow some freedom to adjust the spectral spacing and amplitude between peaks in the reflectance by introducing dispersion into the gap. This aspect is relevant for achieving a high purity of the red color, because the red reflectance spectrum typically involves some leakage from the blue portion of the spectrum.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectra of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the IMOD 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the IMOD 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the IMOD 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated IMOD 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
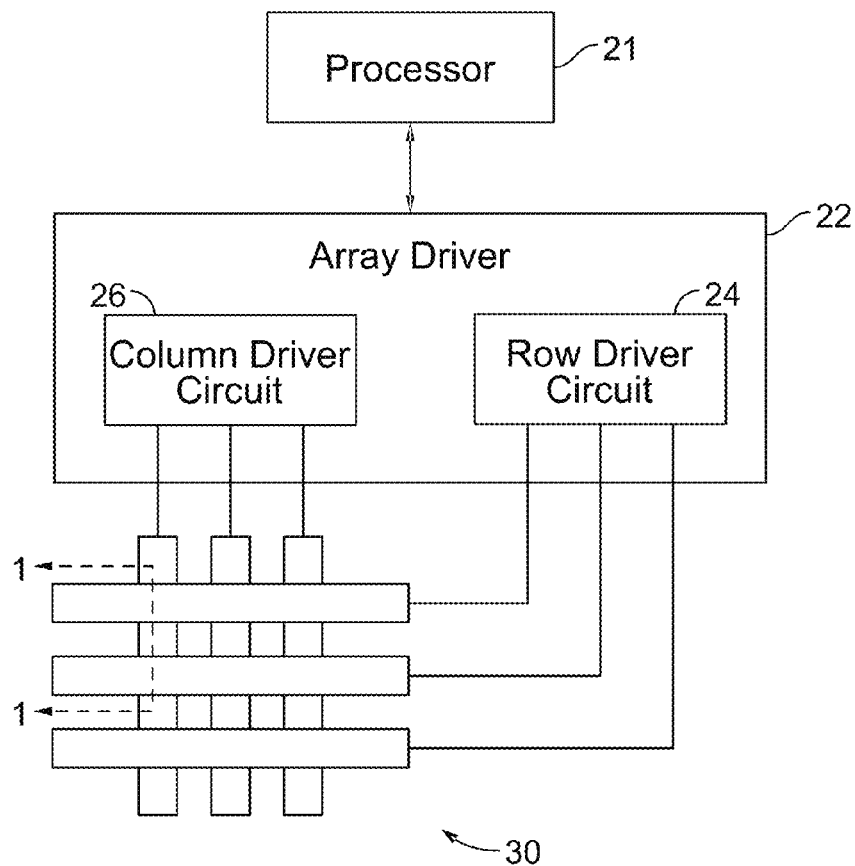
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
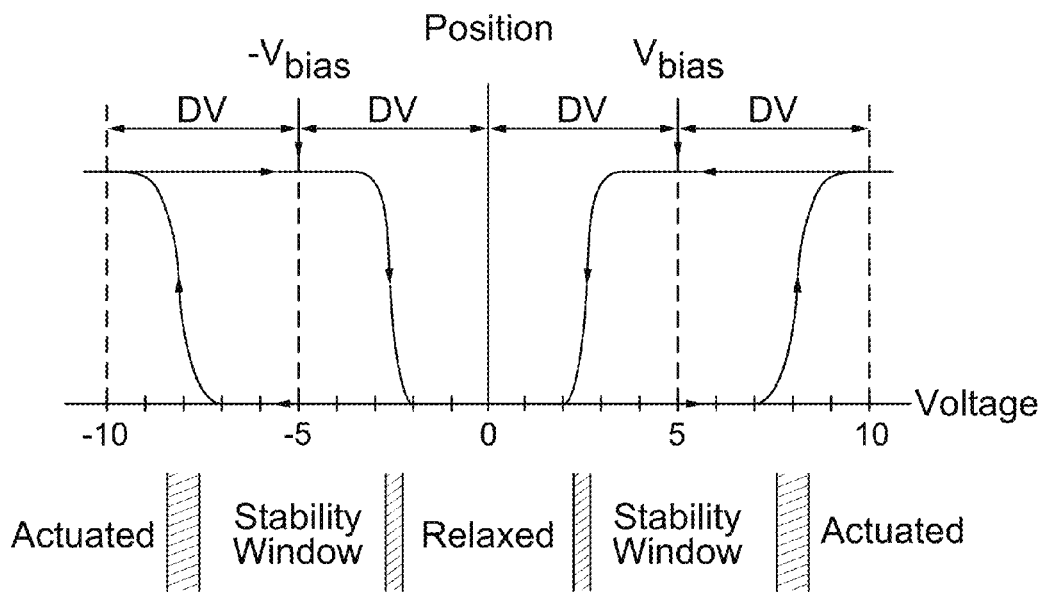
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10 volts, however, the movable reflective layer does not relax completely until the voltage drops below 2 volts. Thus, a range of voltage, approximately 3 to 7 volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10 volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7 volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
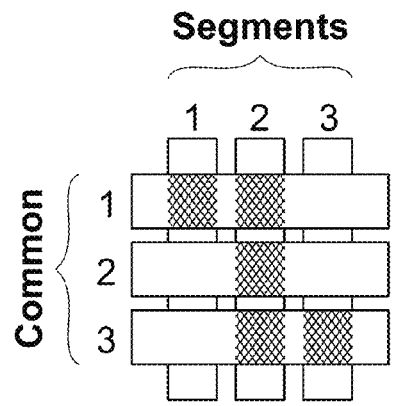
FIG. 5A shows an example of a diagram illustrating a frame of display data in the 3×3 interferometric modulator display of FIG. 2.
Figure 5B:
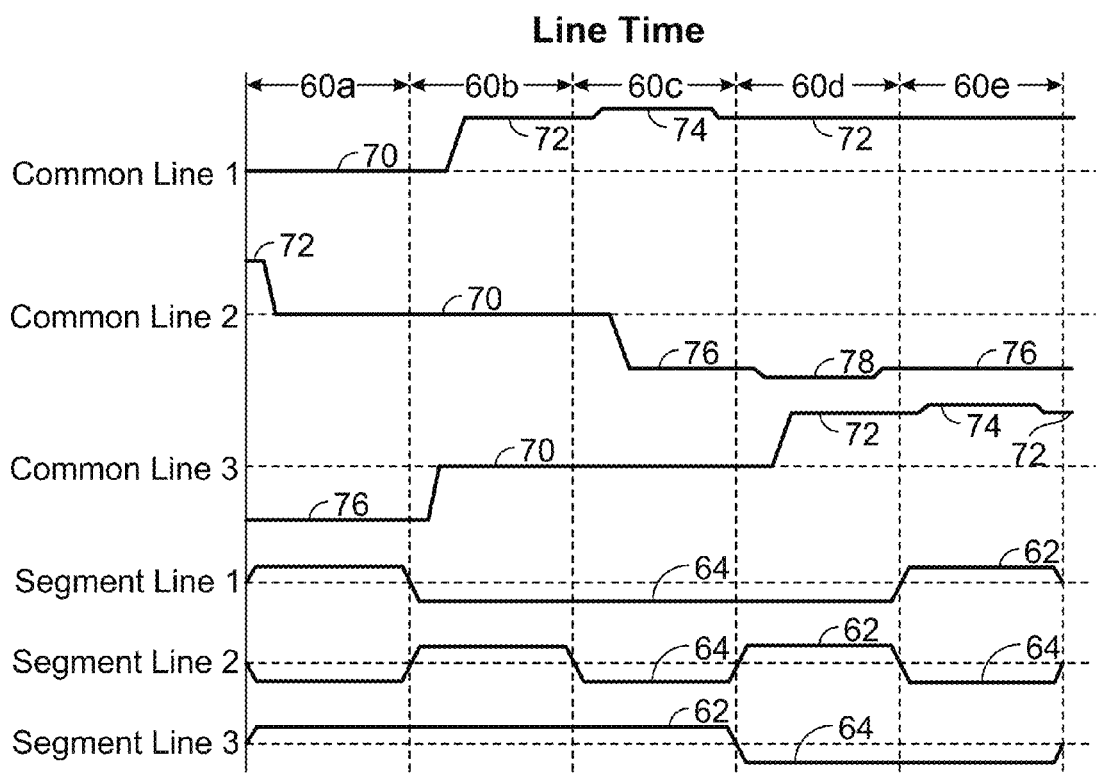
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
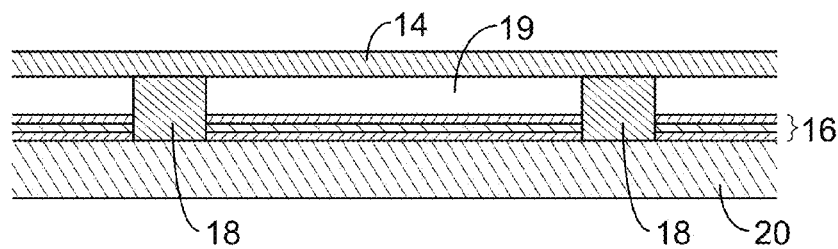
FIG. 6A shows an example of a partial cross-section of the interferometric modulator display of FIG. 1.
Figure 6B:
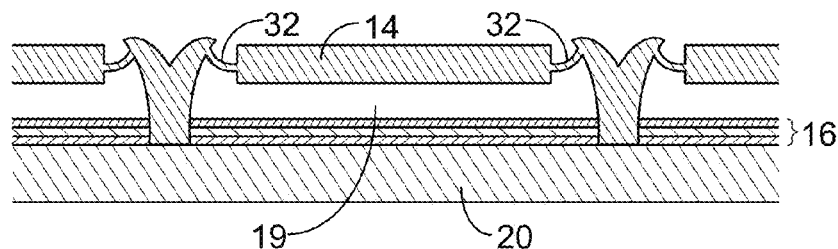
FIGS. 6B-6E show examples of cross-sections of varying implementations of interferometric modulators.
Figure 6C:
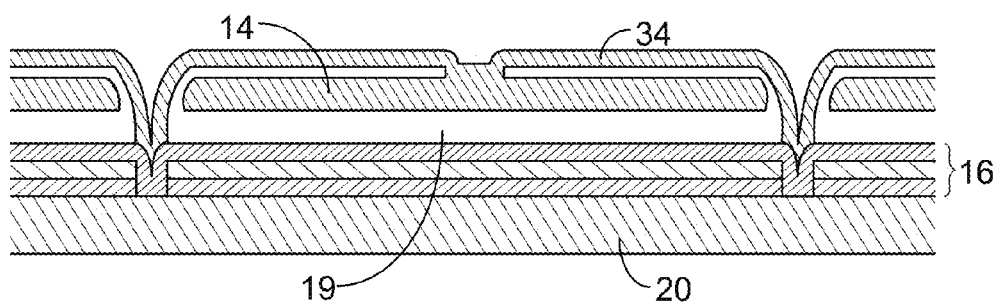

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
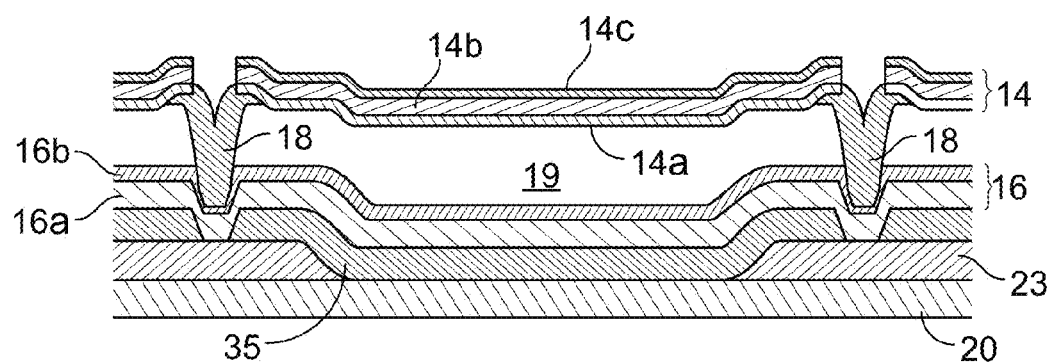

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, an $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride (BCl$_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
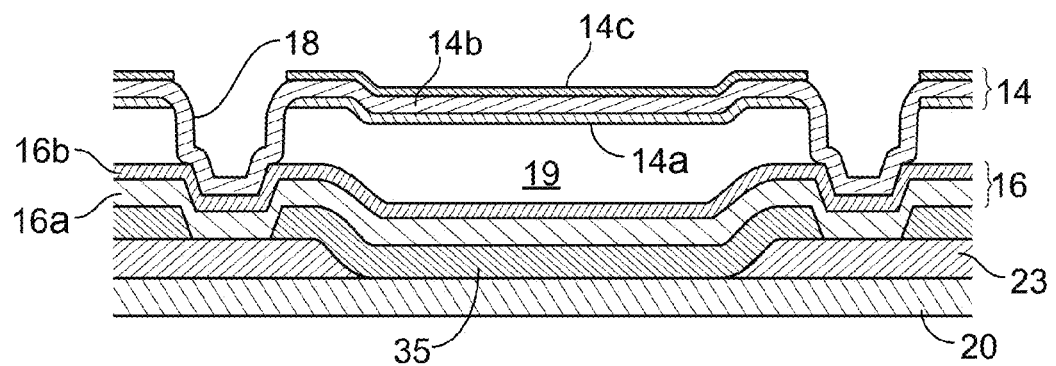

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
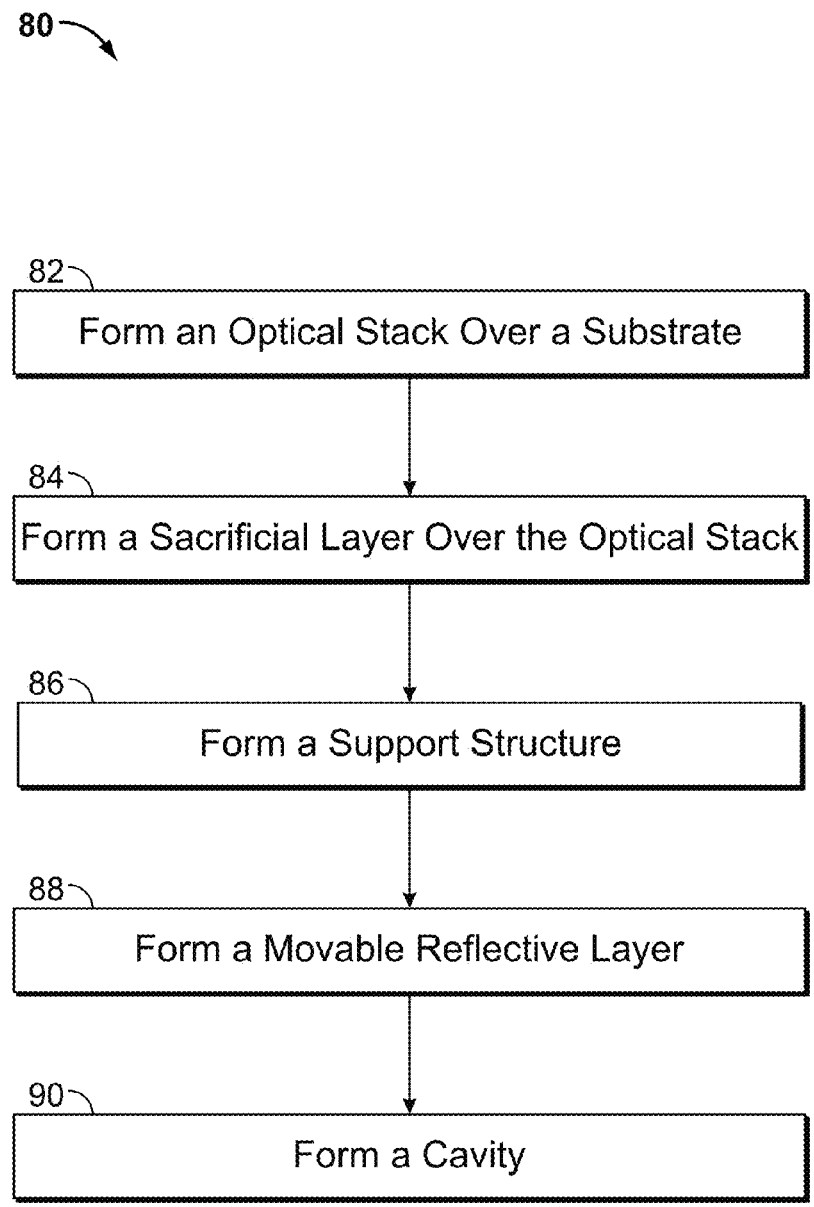
FIG. 7 shows an example of a flow diagram illustrating a manufacturing process for an interferometric modulator.
Figure 8A:
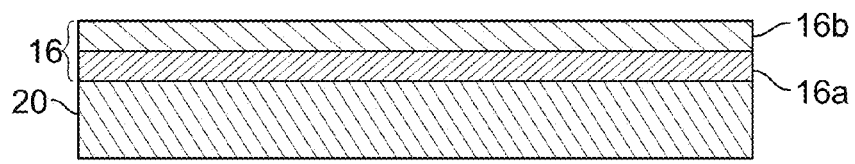
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
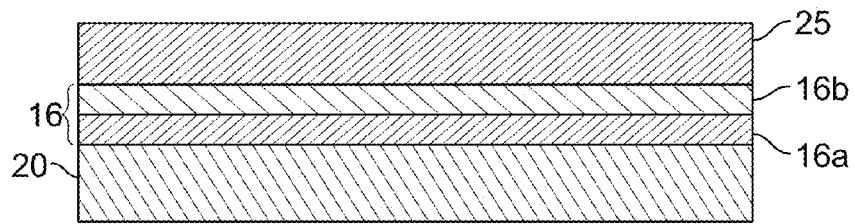

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride (XeF$_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
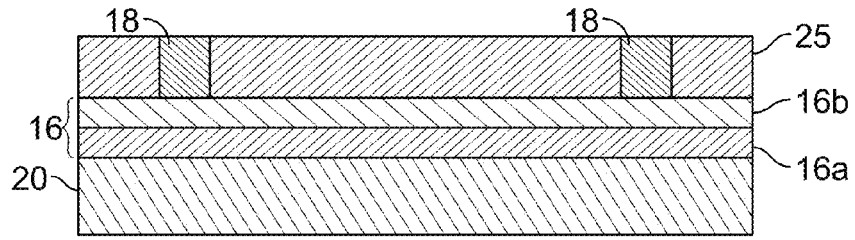

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning to remove portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
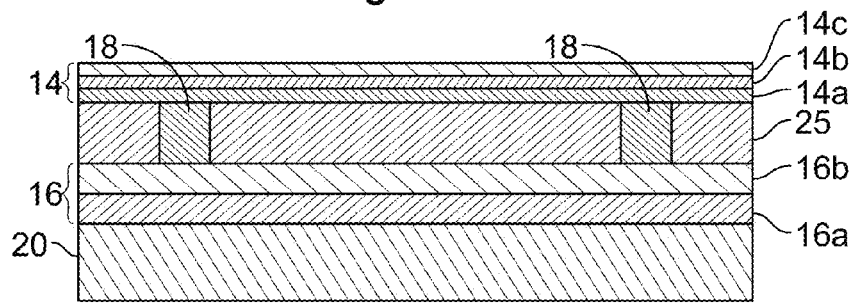
Figure 8E:
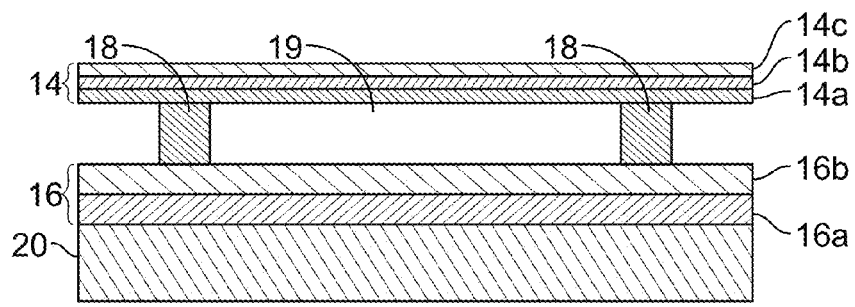

The process 80 continues at block 88 with the formation of a movable reflective layer or membrane such as the movable reflective layer 14 illustrated in FIGS. 1, 6 and 8D. The movable reflective layer 14 may be formed by employing one or more deposition processes, e.g., reflective layer (e.g., aluminum, aluminum alloy) deposition, along with one or more patterning, masking, and/or etching processes. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other combinations of etchable sacrificial material and etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

The reflectance spectrum of an IMOD or other EMS reflective display device can create a relatively broad spectral band which can be shifted across the wavelengths of the visible spectrum to generate different colors. The visible spectrum, that is, the range of wavelengths that humans can perceive, ranges from about 390 nanometers (nm) to about 750 nm. Within the visible spectrum, the approximate wavelengths of colors in the spectrum are as follows: red, about 700 nm to 635 nm; orange, about 635 nm to 590 nm; yellow, about 590 nm to 560 nm; green, about 560 nm to 490 nm; blue, about 490 nm to 450 nm; and violet, about 450 nm to 400 nm. As noted above, the position of the spectral band for an IMOD or other EMS reflective display device can be adjusted by changing the thickness of the optical cavity. This may be accomplished by changing the position of the movable reflective layer.

Depending on the material of the absorber layer, also referred to as a partially reflective layer, a thickness of the absorber layer may exist that increases the color gamut and yields good saturation at the primary color settings (i.e., red, green, and blue (RGB)) of the IMOD or other EMS reflective display device. Color gamut refers to the various levels of colors that can potentially be displayed by a device. Saturation refers to a dominance of a hue in a color or to how pure the color is. For example, a fully saturated blue would be pure blue color.

One issue posed by some EMS reflective display devices, however, is poor red color (i.e., about 700 nm to 635 nm) performance. For example, to obtain a red color with an EMS reflective display device, the reflective layer may be positioned such that the standing wave formed by light transmitted though the absorber layer and the light reflected from the reflective layer has a first node at half of the red color wavelength (i.e., about half of 700 nm to 635 nm) where the absorber layer is located. The red color wavelength may experience a minimum absorption and the display may reflect a red color. The first node of the red color wavelength, however, coincides with a portion of the second node of the blue color, which may corrupt the saturation of the red color produced by the EMS reflective display device.

One or more matching layers may be included on the absorber layer and may improve the red color performance of an EMS reflective display device. With certain thicknesses of each of the one or more matching layers, the light interference produced by the EMS reflective display device can be modified. For example, one or more matching layers may reduce extraneous reflection from the absorber layer. This may increase the absorption (and consequently, decrease the reflection) of a color that may be corrupting the saturation of the desired color through the destructive interference between the reflected and transmitted light. Consequently, an enhancement of the color saturation for a specific primary color or for the complete primary color set (i.e., RGB color set) may be achieved.

When a single matching layer is included on the absorber layer, the thickness of the matching layer may be varied to modify both the amplitude and the phase of the light. This may reduce the reflection of the "corrupting" color (and consequently, increase the absorption) from the EMS reflective display device. In the case of a single matching layer, the refractive index of the matching layer may be about $(n_1 \times n_2)^{1/2}$, where $n_1$ is the refractive index of the absorber layer and $n_2$ is the refractive index of the incident medium above the matching layer (e.g., glass or air). Varying the thickness of a single matching layer, however, may not provide sufficient degrees of freedom for optimizing both the amplitude and the phase of the light.

Two or more matching layers on the absorber layer may provide additional degrees of freedom for modifying the amplitude and the phase of the light. In the case of more than one matching layer, a high refractive index matching layer and a low refractive index matching layer may be deposited on the absorber layer. In some implementations, the low refractive index matching layer may be in contact with the absorber and the high refractive index matching layer may be in contact with the incident medium (e.g., glass or air).

Figure 9:
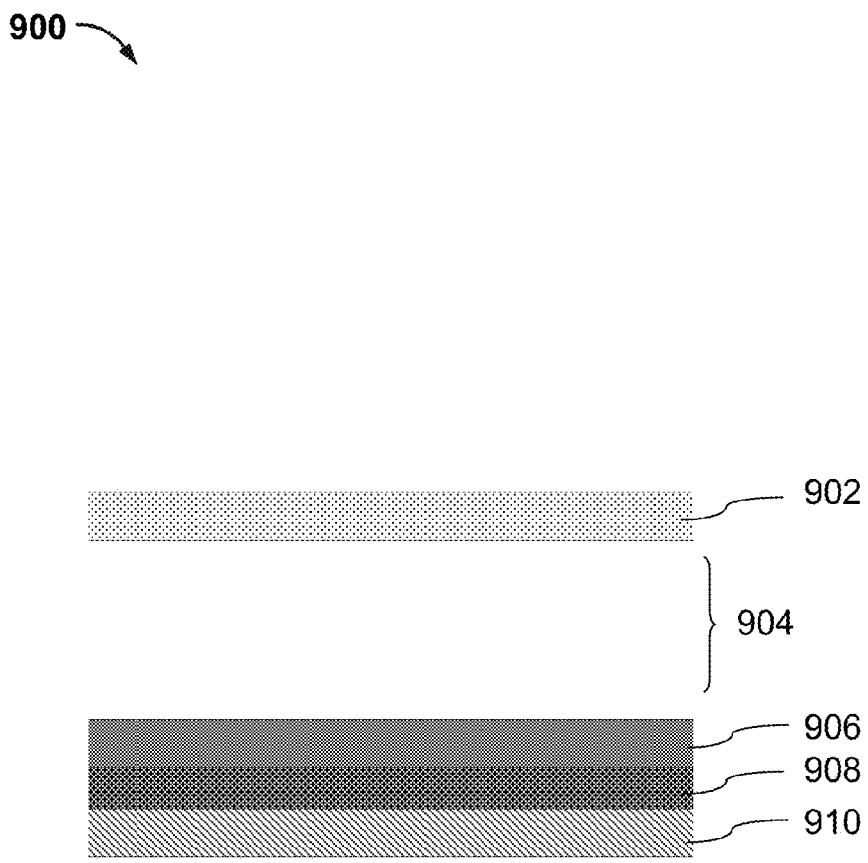
FIGS. 9 and 10 show examples of cross-sectional schematic diagrams of a portion of an EMS reflective display device.
Figure 10:
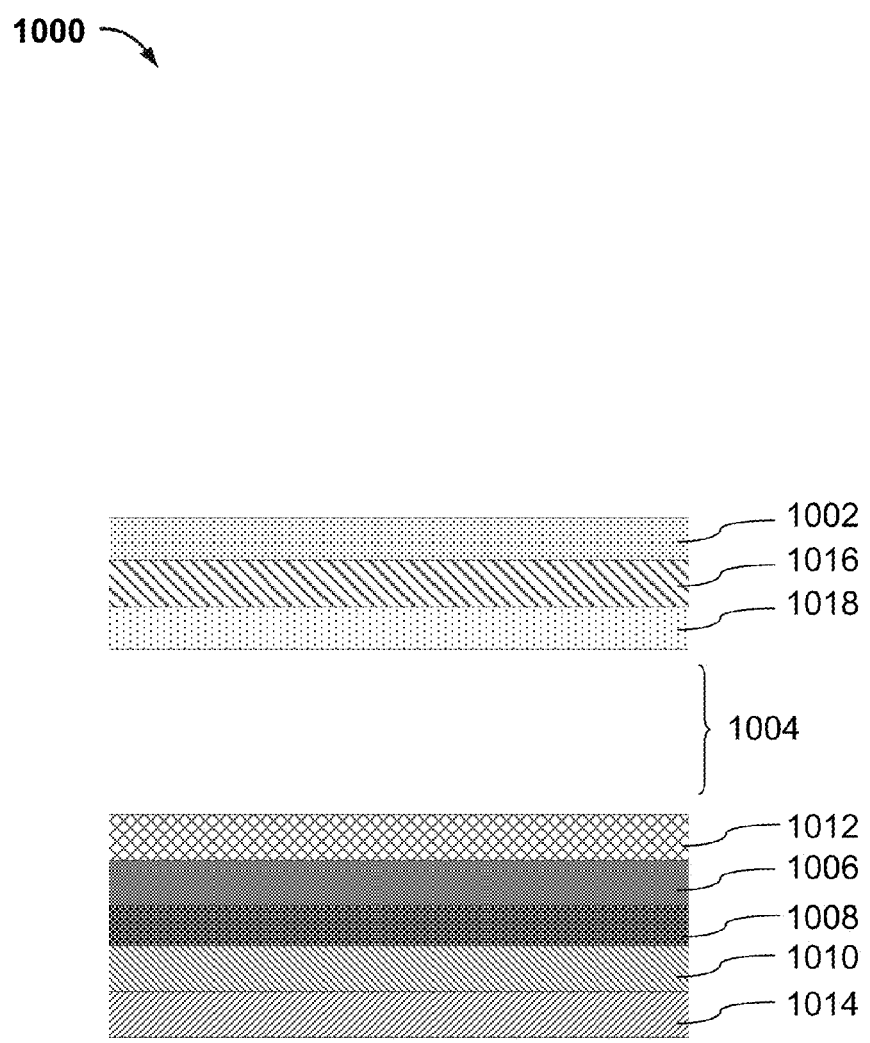

FIGS. 9 and 10 show examples of cross-sectional schematic diagrams of a portion of an EMS reflective display device. Turning first to FIG. 9, the EMS reflective display device 900 includes a reflective layer 902 and an absorber layer 906, with the reflective layer 902 and the absorber layer 906 defining a cavity or gap 904. A first matching layer 908 is disposed on the surface of the absorber layer 906 facing away from the cavity. A second matching layer 910 is disposed on the first matching layer 908.

The absorber layer 906 of the EMS reflective display device 900 may be formed from a variety of materials that are partially absorptive and partially reflective, such as various metals, including chromium (Cr), tungsten (W), nickel (Ni), vanadium (V), and an alloy of molybdenum-chromium (MoCr). In some implementations, the absorber layer 906 may be less than about 20 nm thick. In some other implementations, the absorber layer 906 can be thicker than about 20 nm. In some implementations, the absorber layer may include dyes or nanoparticles embedded in a host matrix.

In some other implementations, the absorber layer 906 may include two materials that are partially absorptive and partially reflective that are separated with dielectric spacers. The thickness of such an absorber layer may be about the same thickness as an absorber layer that includes a single layer of material that is partially absorptive and partially reflective. Such an absorber layer may be adjusted (e.g., the materials of the absorber layer and the thicknesses of the materials) to make small changes in the reflectance characteristics of the EMS reflective display device.

In some implementations of the EMS reflective display device 900, the first matching layer 908 may include a low refractive index material and the second matching layer 910 may include a high refractive index material. That is, in some implementations, the material of the second matching layer 910 may have a refractive index that is greater than the refractive index of the material of the first matching layer 908. The refractive index of a material is a measure of the speed of light in that material. Examples of low refractive index materials include silicon oxide ($SiO_2$) magnesium fluoride ($MgF_2$), aluminum oxide ($Al_2O_3$), other dielectric materials, and different plastics. Example of low refractive index plastics include various polymer materials, including as acrylates. Examples of high refractive index materials include titanium oxide ($TiO_2$), silicon oxynitride (SiON), silicon nitride ($Si_3N_4$) zirconium dioxide ($ZrO_2$), tantalum oxide ($Ta_2O_5$), antimony oxide ($Sb_2O_3$), and other dielectric materials.

Each of the matching layers has a thickness. The thicknesses of the matching layers may be specified such that the amplitude and the phase of light reflected from the absorber layer 906 and the amplitude and the phase of light transmitted though the absorber layer 906 is modified to alter or improve the RGB color saturation of the EMS reflective display device 900. In some implementations, the optical thickness the first matching layer 908 and the second matching layer 910 may be about one quarter of the wavelength of interest in the first matching layer to reduce the Fresnel reflection from the absorber layer. In some implementations, the thickness of the first matching layer 908 and the second matching layer 910 may be specified to suppress spurious wavelengths (i.e., wavelengths not of interest or outside the preferred range of the visible spectrum) through destructive interference. In some implementations, the thickness of the first matching layer 908 and the second matching layer 910 may be specified to increase the wavelength of interest through constructive interference. Thus, the thickness of a matching layer depends in part on the refractive index of the matching layer. For visible light, each of the thicknesses of the first matching layer 908 and the second matching layer 910 may be about 4 nm to 120 nm or about 120 to 170 nm, in some implementations.

The thicknesses of the first matching layer 908 and the second matching layer 910 also may depend on the dispersion properties and the thickness of the absorber layer 906 and the dispersion properties of each of the matching layers 908 and 910. Further, the thicknesses of each the matching layers 908 and 910 may depend on the design of the EMS device, including the thickness and dispersion properties of the reflective layer 902 and of any passivation layers, if present, on the absorber layer 906. Nominally, the thicknesses of the matching layers may be about one quarter of a wavelength of interest, after taking into account to the refractive indexes of the matching layers.

These thicknesses of the matching layers may reduce the Fresnel reflection from the absorber layer. In some other implementations, the thicknesses of the matching layers may be greater or less than one quarter of the wavelength of interest in the matching layers. This may be because the destructive interference may include all the reflections, and these thicknesses of the matching layers may reduce the spurious reflection of a particular wavelength band. An appropriate thickness for a matching layer may be determined after accounting for the dispersion of the matching layer as well as the dispersion of the absorber layer itself.

Turning now to FIG. 10, FIG. 10 shows another example of a cross-sectional schematic diagram of a portion of an EMS reflective display device. The EMS reflective display device 1000 includes a reflective layer 1002 and an absorber layer 1006. The reflective layer 1002 and the absorber layer 1006 define a cavity or gap 1004. A first matching layer 1008 is disposed on the surface of the absorber layer 1006 facing away from the cavity. A second matching layer 1010 is disposed on the first matching layer 1008.

The EMS reflective display device further includes a dielectric layer 1012 disposed on the surface of the absorber layer 1006 facing towards the cavity. In some implementations, the dielectric layer 1012 may be aluminum oxide ($Al_2O_3$). In some other implementations, the dielectric layer 1012 may be $Ta_2O_5$, hafnium oxide ($HfO_2$), or aluminum nitride (AlN). In some implementations, the dielectric layer 1012 may be less than about 5 nm thick, about 9 nm thick, or about 5 nm to 15 nm thick. The dielectric layer 1012 may serve to passivate the absorber layer 1006 or to aid in preventing stiction in the EMS reflective display device 1000, in some implementations. The dielectric layer 1012 also may serve to protect the absorber layer 1006 from etchants used to remove sacrificial material from the EMS reflective display device 1000 and/or as an etch stop during the manufacturing process for the EMS reflective display device.

In some implementations, the absorber assembly, including the dielectric layer 1012, the absorber layer 1006, the first matching layer 1008, and the second matching layer 1010, may be on a substrate 1014. The substrate 1014 may be a transparent substrate such as glass (e.g., a display glass or a borosilicate glass) or plastic, and it may be flexible or relatively stiff and unbending. In some implementations, a glass substrate may be about 400 microns to 1000 microns thick, or about 700 microns thick.

In some implementations, the absorber layer 1006 may be vanadium (V) that may be about 7.5 nm thick. With such an absorber layer 1006, the first matching layer 1008 may be a layer of $SiO_2$ that is about 27 nm thick. The second matching layer 1010 may be a layer of $Si_3N_4$ that is about 22 nm thick. These thicknesses of a vanadium absorber layer combined with the first matching layer 1008 of $SiO_2$ and the second matching layer 1010 of $Si_3N_4$ are specified to improve the RGB color saturation of the EMS reflective display device 1000. This combination of the absorber layer 1006, the first matching layer 1008, and the second matching layer 1010 may, e.g., improve the red color saturation by reducing the spurious blue-green light when the cavity 1004 is in a position for reflecting red light. In some other implementations, other materials may be used for the first matching layer 1008 and the second matching layer 1010. Such materials may include the materials listed above for the matching layers in the EMS reflective display device 900. When other materials are used for the first matching layer 1008 and the second matching layer 1010, the thicknesses of these layers may be adjusted to achieve the desired optical response, as the thicknesses of the matching layers depend on the index of refraction of each of the matching layers.

In some implementations, the reflective layer 1002 may be Al. In some implementations, the reflective layer 1002 may include dielectric layers on the surface of the reflective layer. As shown in FIG. 10, the reflective layer 1002 includes a first dielectric layer 1016 disposed on the surface of the reflective layer 1002 facing the cavity. A second dielectric layer 1018 is disposed on the surface of the first dielectric layer 1016. In some implementations, the first dielectric layer 1016 may include a low refractive index material and the second dielectric layer 1018 may include a high refractive index material.

For example, in some implementations, the first dielectric layer 1016 may be a SiON layer having a thickness of about 50 to 90 nm, or about 72 nm. In some implementations, the second dielectric layer 1018 may be a $TiO_2$ layer having a thickness of about 15 to 35 nm, or about 24 nm. In some other implementations, the first dielectric layer 1016 may include $SiO_2$, $MgF_2$, or different plastics and the second dielectric layer 1018 may include $Si_3N_4$, $Ta_2O_5$, $ZrO_2$, or other dielectric materials. The dielectric layers 1016 and 1018 may serve to reduce the spatial separation of standing wave first order nodes of different wavelengths for achieving good white color. The dielectric layers 1016 and 1018 also may serve as passivation layers to aid in preventing stiction in the EMS reflective display device 1000, in some implementations. The dielectric layers 1016 and 1018 also may serve to protect the reflective layer 1002 from etchants used to remove sacrificial material from the EMS reflective display device 1000 and/or as an etch stop during the manufacturing process for the EMS reflective display device.

In further implementations of matching layers on an absorber layer, two or more matching layers may be included. For example, in some implementations, a first matching layer may be disposed on the surface of the absorber layer, a second matching layer may be disposed on the first matching layer, and a third matching layer may be disposed on the second matching layer. A third matching layer may provide further degrees of freedom for the modifying of the amplitude and the phase of the light. For example, in some implementations, the third matching layer may include any of the low refractive index materials or high refractive index materials described herein. In some implementations, the third matching layer may be about 5 nm to 50 nm thick. When three matching layers are included on an absorber layer, the thicknesses of each of the matching layers may be specified such that the amplitude and the phase of light reflected from the absorber layer and the amplitude and the phase of light transmitted though the absorber layer is modified to alter or improve the RGB color saturation of the EMS reflective display device in which absorber layer is incorporated.

In the above-described implementations, a first matching layer may include a low refractive index material disposed on the surface of the absorber layer facing away from the cavity and a second matching layer may include a high refractive index material disposed on the first matching layer. In some other implementations, a first matching layer may include a high refractive index material disposed on the surface of the absorber layer facing away from the cavity and a second matching layer may include a low refractive index material disposed on the first matching layer. For example, the first matching layer may include a high refractive index material and the second matching layer may include a low refractive index material disposed on the first matching layer when the first matching layer includes a metal with non-uniform absorption properties.

Figure 11:
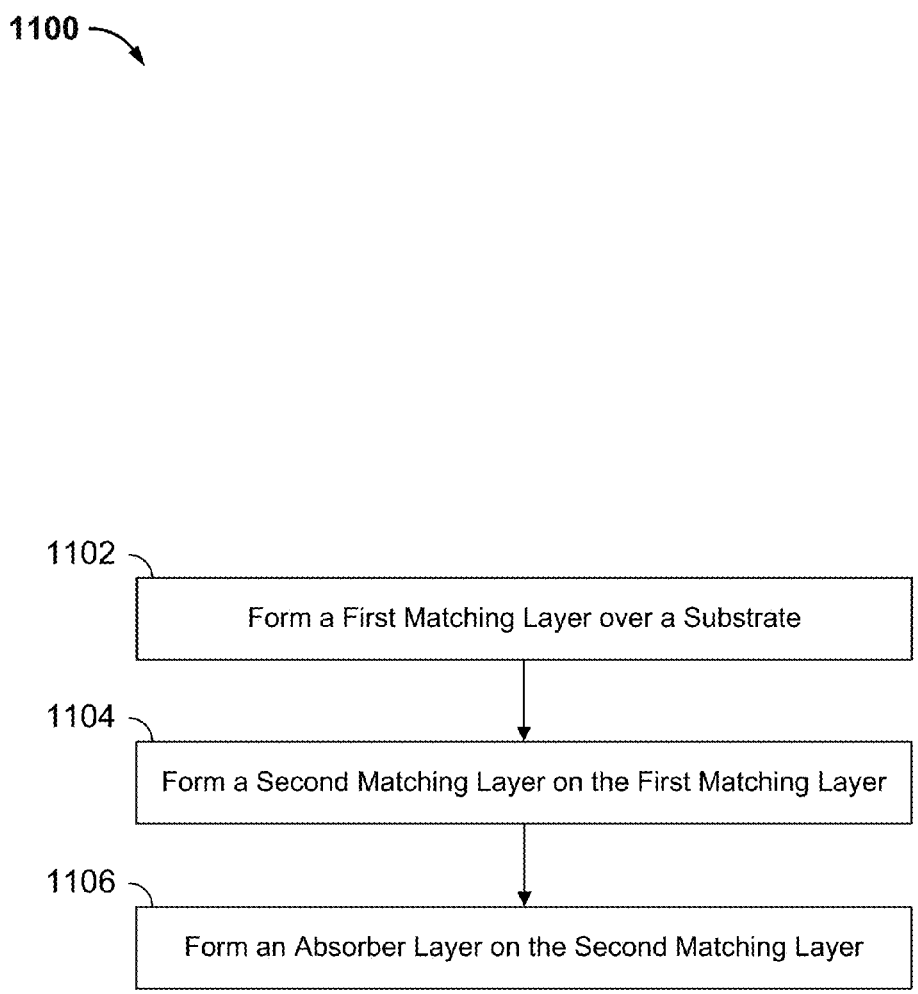
FIG. 11 shows an example of a flow diagram illustrating a manufacturing process for matching layers of an EMS reflective display device.

FIG. 11 shows an example of a flow diagram illustrating a manufacturing process for matching layers of an EMS reflective display device. The manufacturing process 1100 in FIG. 11 may be part of the manufacturing process for forming an optical stack over a substrate of the an EMS reflective display device, as described with respect to block 82 of the process 80 in FIG. 7.

Starting with block 1102, a first matching layer is formed over a substrate. The first matching layer may be formed using deposition processes including PVD processes, CVD processes, liquid phase deposition processes, and atomic layer deposition (ALD) processes. At block 1104, a second matching layer is formed on the first matching layer. The second matching layer may be formed using similar deposition processes that may be used to form the first matching layer, including PVD processes, CVD processes, liquid phase deposition processes, and ALD processes. At block 1106, the absorber layer is formed on the second matching layer. The absorber layer may be a metal and may be formed using deposition processes including PVD processes, CVD processes, liquid phase deposition processes, and ALD processes. In implementations in which the first matching layer or the second matching layer is a plastic, organic material based thin film techniques may be used to form the first matching layer or the second matching layer.

The manufacturing process for an EMS reflective display device may include further operations associated with the substrate, as described above with reference to FIG. 7. After the formation of the optical stack at block 82, the manufacturing process for an EMS reflective display device may continue with the operation at block 84, as described above with reference to FIG. 7.

Figure 12:
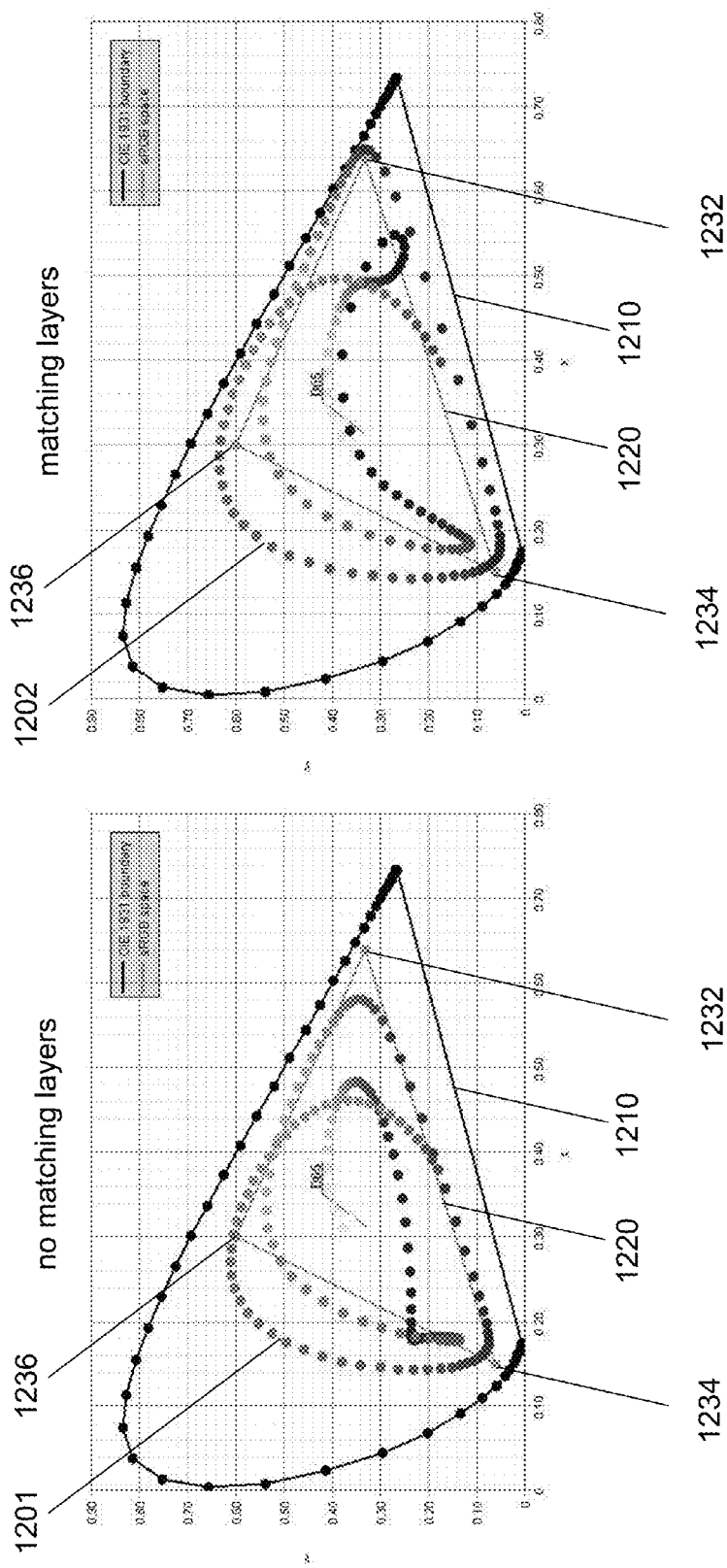
FIGS. 12A and 12B show color space diagrams for the color palettes produced by EMS reflective display devices.

Examples of the improvements in the performance of an EMS reflective display device including matching layers on the absorber layer versus an EMS reflective display device without matching layers on the absorber layer are shown in FIGS. 12A and 12B. The EMS reflective display devices included a V absorber layer having a thickness of about 7.5 nm on a glass substrate. For the display device including matching layers, a first matching layer of $SiO_2$ having a thickness of about 27 nm thick was on the V absorber layer and a second matching layer of $Si_3N_4$ having a thickness of about 22 nm was on the $SiO_2$ matching layer, with the $Si_3N_4$ matching layer also on a glass substrate. Other absorber layers and other matching layers of appropriate thicknesses may be used to obtain similar results.

FIGS. 12A and 12B show International Commission on Illumination (CIE) xy chromaticity diagrams for the color palettes produced by the EMS reflective display devices. FIG. 12A shows the color palette 1201 produced by the EMS reflective display device not including matching layers. FIG. 12B shows the color palette 1202 produced by the EMS reflective display device including the matching layers. Also shown on each of the CIE xy chromaticity diagrams are the boundaries 1210 of the CIE 1931 color space and the boundaries 1220 of the standard RGB (sRGB) color space (i.e., the triangle formed by sRGB primaries). The CIE 1931 color space is a mathematically define color space. The sRBG color space is a color space commonly used with computing applications, including monitors, printers, e-readers, tablet devices, smartphones and Internet applications. For the sRGB color space, the point 1232 corresponds to the red color, the point 1234 corresponds to the blue color, and the point 1236 corresponds to the green color. A color palette extending to the edges of the boundaries 1210 of the CIE 1931 color space would have the most saturated colors.

Comparing FIGS. 12A and 12B, the color palette 1201 shown in FIG. 12A (EMS reflective display device with no matching layers) does not extend to the red color 1232 of the sRBG color space as the color palette 1202 shown in FIG. 12B (EMS reflective display device with matching layers) does. Further, the color palette 1202 shown in FIG. 12B extends closer to the blue color 1234 and past the green color 1236 compared to the color palette 1201 shown in FIG. 12A. The color palette 1202 shown in FIG. 12B thus has an improvement in the RGB color saturation, with slight improvements in the blue and green color saturation and a large improvement in the red color saturation, for the EMS reflective display device including the matching layers.

Figure 13:
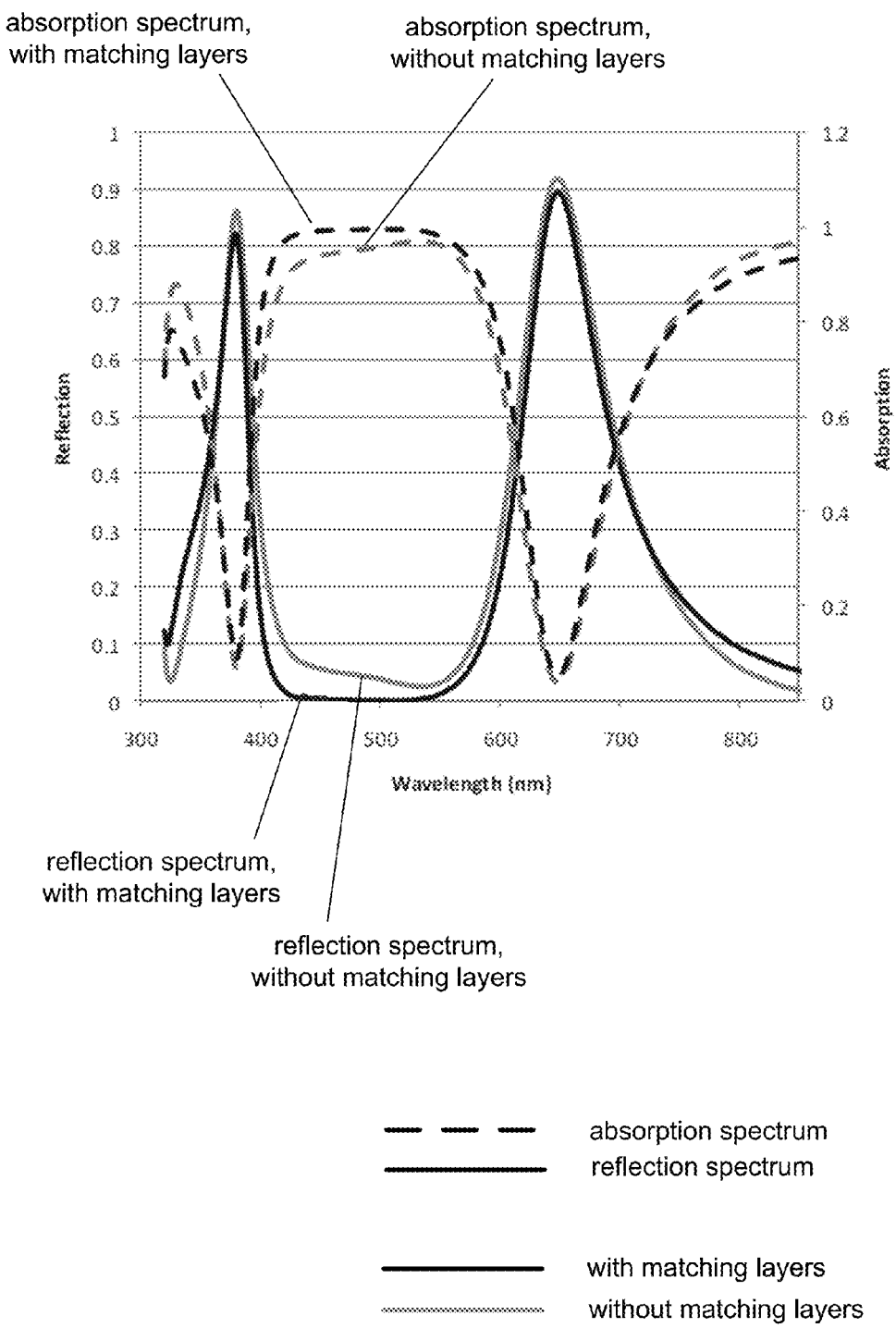
FIG. 13 shows a plot of the spectrum of the red color produced by the two EMS reflective display devices, one not including matching layers and one including matching layers.

FIG. 13 shows a plot of the spectrum of the red color produced by the two EMS reflective display devices discussed with respect to FIGS. 12A and 12B, i.e., one not including matching layers (12A) and one including matching layers (12B). The solid lines are the reflection spectra and the dashed lines are the absorption spectra. The grey lines are the reflection and absorption spectra of the EMS reflective display device without matching layers. The black lines are the reflection and absorption spectra of the EMS reflective display device with matching layers. Comparing the reflection spectra of the EMS reflective display devices at wavelengths of about 400 nm to 550 nm, the reflection spectrum of the EMS reflective display device with matching layers is reduced compared to the reflection spectrum of the EMS reflective display device without matching layers. The wavelength range of about 400 nm to 500 nm includes the colors violet (about 400 nm to 450 nm) and blue (about 450 nm to 490 nm). The improvement in the red color saturation shown in FIG. 12B versus FIG. 12A is the result of the suppression of the reflection at the wavelengths of about 400 nm to 550 nm.

For an optical device, the reflection, transmission, and absorption of a wavelength of light will generally account for all of the interactions of the wavelength of light with the device. Thus, the sum of the reflection, transmission, and absorption of a wavelength of light will generally be equal to one, i.e., the reflection, transmission, and absorption of the wavelength of light will account for all or 100% of the interactions of the wavelength of light with the device. Thus, comparing the absorption spectra of the EMS reflective display devices at a wavelength range of about 400 nm to 550 nm, the absorption spectrum of the EMS reflective display device with matching layers is increased compared to the absorption spectrum of the EMS reflective display device without matching layers (e.g., when the transmission of a wavelength of light remains about the same, reducing the reflection will increase the absorption of the wavelength of light). The wavelength range of about 400 nm to 500 nm includes the colors violet (about 400 nm to 450 nm) and blue (about 450 nm to 490 nm). The improvement in the red color saturation shown in FIG. 12B versus FIG. 12A also is the result of the increase of the absorption at the wavelengths of about 400 nm to 550 nm.

Implementations of the IMODs and other EMS reflective display devices described herein were described with respect to the visible spectrum, that is, the range of wavelengths from about 390 nm to about 750 nm. The matching layers disposed on an absorber layer also may be tailored for use in IMODs and other EMS reflective display devices that function with different wavelengths of electromagnetic radiation, such as infrared light or ultraviolet light, for example.

Figure 14A:
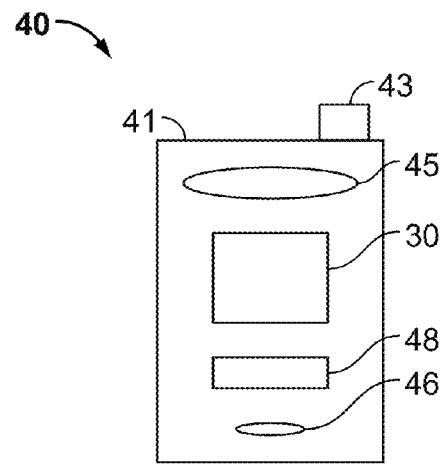
FIGS. 14A and 14B show examples of system block diagrams illustrating a display device that includes a plurality of interferometric modulators.
Figure 14B:
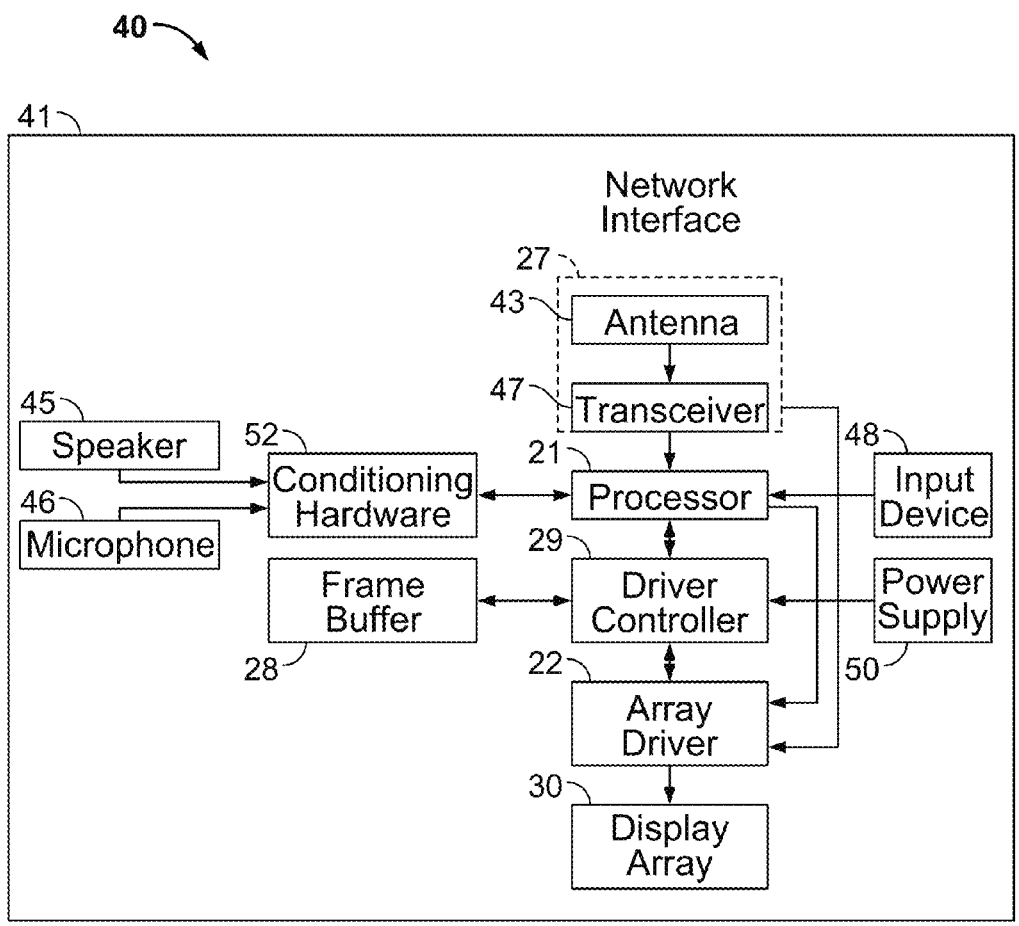

FIGS. 14A and 14B show examples of system block diagrams illustrating a display device 40 that includes a plurality of interferometric modulators. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   a reflective layer;
   an absorber layer spaced apart from the reflective layer to define a cavity between the absorber layer and the reflective layer, wherein the absorber layer is capable of transmitting light into the cavity, absorbing light, and reflecting light, the absorber layer including a metal layer;
   a stack disposed on a surface of the reflective layer facing the cavity, the stack including a first dielectric layer and a second dielectric layer, the first dielectric layer including a low refractive index material and the second dielectric layer including a high index material; and
   a plurality of matching layers on a surface of the absorber layer facing away from the cavity, the plurality of matching layers including a first matching layer disposed on the absorber layer and a second matching layer disposed on the first matching layer.

2. The apparatus of claim 1, the first matching layer having a first thickness, the second matching layer having a second thickness, the first and the second thicknesses configured to modify at least one of an amplitude and a phase of reflected light and transmitted light to alter a red-green-blue color saturation of the apparatus.

3. The apparatus of claim 1, wherein the first matching layer includes a first material having a first refractive index, wherein the second matching layer includes a second material having a second refractive index, and wherein the second refractive index is greater than the first refractive index.

4. The apparatus of claim 1, wherein the metal layer includes at least one of vanadium, chromium, tungsten, nickel, or an alloy of molybdenum-chromium.

5. The apparatus of claim 1, wherein the first matching layer includes at least one of silicon dioxide, magnesium fluoride, aluminum oxide, or a plastic.

6. The apparatus of claim 1, wherein the second matching layer includes at least one of silicon nitride, silicon oxynitride, titanium dioxide, zirconium dioxide, tantalum oxide, or antimony oxide.

7. The apparatus of claim 1, wherein the reflective layer is configured to be movable to vary a thickness of the cavity.

8. The apparatus of claim 1, wherein the plurality of matching layers further includes a third matching layer disposed on the second matching layer.

9. The apparatus of claim 1, further including a dielectric layer disposed on a surface of the absorber layer facing towards the cavity.

10. The apparatus of claim 1, further comprising:
    a display;
    a processor that is configured to communicate with the display, the processor being configured to process image data; and
    a memory device that is configured to communicate with the processor.

11. The apparatus of claim 10, further comprising:
    a driver circuit configured to send at least one signal to the display; and
    a controller configured to send at least a portion of the image data to the driver circuit.

12. The apparatus of claim 10, further comprising:
    an image source module configured to send the image data to the processor, wherein
    the image source module includes at least one of a receiver, transceiver, and transmitter.

13. The apparatus of claim 10, further comprising:
    an input device configured to receive input data and to communicate the input data to the processor.

14. An apparatus comprising:
    a reflective layer;
    an absorber layer spaced apart from the reflective layer to define a cavity between the absorber layer and the reflective layer, wherein the absorber layer is capable of transmitting light into the cavity, absorbing light, and reflecting light, the absorber layer including a metal layer;
    a stack disposed on a surface of the reflective layer facing the cavity, the stack including a first dielectric layer and a second dielectric layer, the first dielectric layer including a low refractive index material and the second dielectric layer including a high index material;
    a first matching layer having a first refractive index disposed on the absorber layer; and
    a second matching layer having a second refractive index disposed on the first matching layer, the second refractive index being greater than the first refractive index.

15. The apparatus of claim 14, the first matching layer having a first thickness, the second matching layer having a second thickness, the first and the second thicknesses configured to modify at least one of an amplitude and a phase of reflected light and transmitted light to alter a red-green-blue color saturation of the apparatus.

16. The apparatus of claim 14, wherein the metal layer includes at least one of vanadium, chromium, tungsten, nickel, or an alloy of molybdenum-chromium.

17. The apparatus of claim 14, wherein the reflective layer is configured to be movable to vary a thickness of the cavity.

18. An apparatus comprising:
a reflective layer;
an absorber layer spaced apart from the reflective layer to define a cavity between the absorber layer and the reflective layer, wherein the absorber layer is capable of transmitting light into the cavity, absorbing light, and reflecting light, the absorber layer including a metal layer, wherein the reflective layer is configured to be movable to vary a thickness of the cavity;
a stack disposed on a surface of the reflective layer facing the cavity, the stack including a first dielectric layer and a second dielectric layer, the first dielectric layer including a low refractive index material and the second dielectric layer including a high index material; and
a plurality of matching layers on a surface of the absorber layer facing away from the cavity, the plurality of matching layers including a first matching layer disposed on the absorber layer and a second matching layer disposed on the first matching layer.

19. The apparatus of claim 18, the first matching layer having a first thickness, the second matching layer having a second thickness, the first and the second thicknesses configured to modify at least one of an amplitude and a phase of reflected light and transmitted light to alter a red-green-blue color saturation of the apparatus.

20. The apparatus of claim 18, wherein the metal layer includes at least one of vanadium, chromium, tungsten, nickel, or an alloy of molybdenum-chromium.

21. The apparatus of claim 18, wherein the first matching layer includes at least one of silicon dioxide, magnesium fluoride, aluminum oxide, or a plastic.

22. The apparatus of claim 18, wherein the second matching layer includes at least one of silicon nitride, silicon oxynitride, titanium dioxide, zirconium dioxide, tantalum oxide, or antimony oxide.

23. An apparatus comprising:
a reflective layer;
an absorber layer spaced apart from the reflective layer to define a cavity between the absorber layer and the reflective layer, wherein the absorber layer is capable of transmitting light into the cavity, absorbing light, and reflecting light, the absorber layer including a metal layer;
a stack proximate the reflective layer, the stack including means for reducing a spatial separation of standing wave first order nodes of different wavelengths of light; and
means for modifying at least one of an amplitude and a phase of reflected light and transmitted light to alter a red-green-blue color saturation of the apparatus.

24. The apparatus of claim 23, wherein the modifying means includes a plurality of matching layers on a surface of the absorber layer facing away from the cavity, the plurality of matching layers including a first matching layer disposed on the absorber layer and a second matching layer disposed on the first matching layer.

25. The apparatus of claim 23, wherein the stack includes a first dielectric layer and a second dielectric layer, the first dielectric layer including a low refractive index material and the second dielectric layer including a high index material.

* * * * *